United States Patent
Filippi et al.

(10) Patent No.: US 10,816,264 B2
(45) Date of Patent: Oct. 27, 2020

(54) PROCESS FOR PURIFICATION OF A SYNTHESIS GAS CONTAINING HYDROGEN AND IMPURITIES

(71) Applicant: Casale SA, Lugano (CH)

(72) Inventors: Ermanno Filippi, Castagnola (CH); Raffaele Ostuni, Lugano (CH); Damiano Marzari Chiesa, Paradiso (CH)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 14/899,355

(22) PCT Filed: Jun. 25, 2014

(86) PCT No.: PCT/EP2014/063332
§ 371 (c)(1),
(2) Date: Dec. 17, 2015

(87) PCT Pub. No.: WO2014/207011
PCT Pub. Date: Dec. 31, 2014

(65) Prior Publication Data
US 2016/0146535 A1    May 26, 2016

(30) Foreign Application Priority Data
Jun. 26, 2013 (EP) .................................... 13173741

(51) Int. Cl.
*F25J 3/08*       (2006.01)
*C01B 3/02*      (2006.01)
(Continued)

(52) U.S. Cl.
CPC ............... *F25J 3/08* (2013.01); *C01B 3/025* (2013.01); *C01B 3/506* (2013.01); *C01B 3/586* (2013.01);
(Continued)

(58) Field of Classification Search
CPC .................................. F25J 3/08; C01B 3/586
See application file for complete search history.

(56) References Cited

U.S. PATENT DOCUMENTS 3,596,470 A * 8/1971 Jakob ..................... C10K 1/165
                                                        62/634
4,296,085 A   10/1981 Banquy
(Continued)

FOREIGN PATENT DOCUMENTS

| EP | 2 065 337 A1 | 6/2009 |
| WO | WO 2012/004032 | * 1/2012 |
| WO | WO 2012/097497 | * 7/2012 |

OTHER PUBLICATIONS

International Search Report issued in connection with PCT/EP2014/063332.
(Continued)

*Primary Examiner* — Douglas B Call
(74) *Attorney, Agent, or Firm* — Akerman LLP

(57) ABSTRACT

A process for purification of a current of hydrogen synthesis gas (100), particularly in the front-end of an ammonia plant, wherein said gas contains hydrogen and minor amounts of carbon monoxide, carbon dioxide, water and impurities, said process including steps of methanation (13) of said current (100), converting residual amounts of carbon monoxide and carbon dioxide to methane and water, dehydration (14) of the gas to remove water, and then a cryogenic purification (15) such as liquid nitrogen wash, to remove methane and Argon; a corresponding plant and method for revamping an ammonia plant are also disclosed.

3 Claims, 1 Drawing Sheet

(51) Int. Cl.
*C01B 3/58* (2006.01)
*F25J 3/02* (2006.01)
*C01B 3/50* (2006.01)

(52) U.S. Cl.
CPC ....... *F25J 3/0223* (2013.01); *C01B 2203/025* (2013.01); *C01B 2203/0283* (2013.01); *C01B 2203/043* (2013.01); *C01B 2203/046* (2013.01); *C01B 2203/047* (2013.01); *C01B 2203/0445* (2013.01); *C01B 2203/0475* (2013.01); *C01B 2203/0495* (2013.01); *C01B 2203/068* (2013.01); *C01B 2203/1235* (2013.01); *C01B 2203/147* (2013.01); *F25J 2220/40* (2013.01)

(56) References Cited

U.S. PATENT DOCUMENTS

| | | | |
|---|---|---|---|
| 5,100,447 A * | 3/1992 | Krishnamurthy | C01C 1/0476 62/630 |
| 7,247,293 B2 * | 7/2007 | Sorace | C01B 3/22 252/372 |
| 2006/0239871 A1 | 10/2006 | Malhotra et al. | |
| 2011/0236293 A1 * | 9/2011 | Hardman | C01B 3/025 423/352 |
| 2012/0213676 A1 | 8/2012 | Filippi et al. | |
| 2012/0308466 A1 | 12/2012 | Filippi et al. | |
| 2013/0101490 A1 * | 4/2013 | Filippi | C01B 3/025 423/359 |

OTHER PUBLICATIONS

International Preliminary Report on Patentability issued in connection with PCT/EP2014/063332.

\* cited by examiner

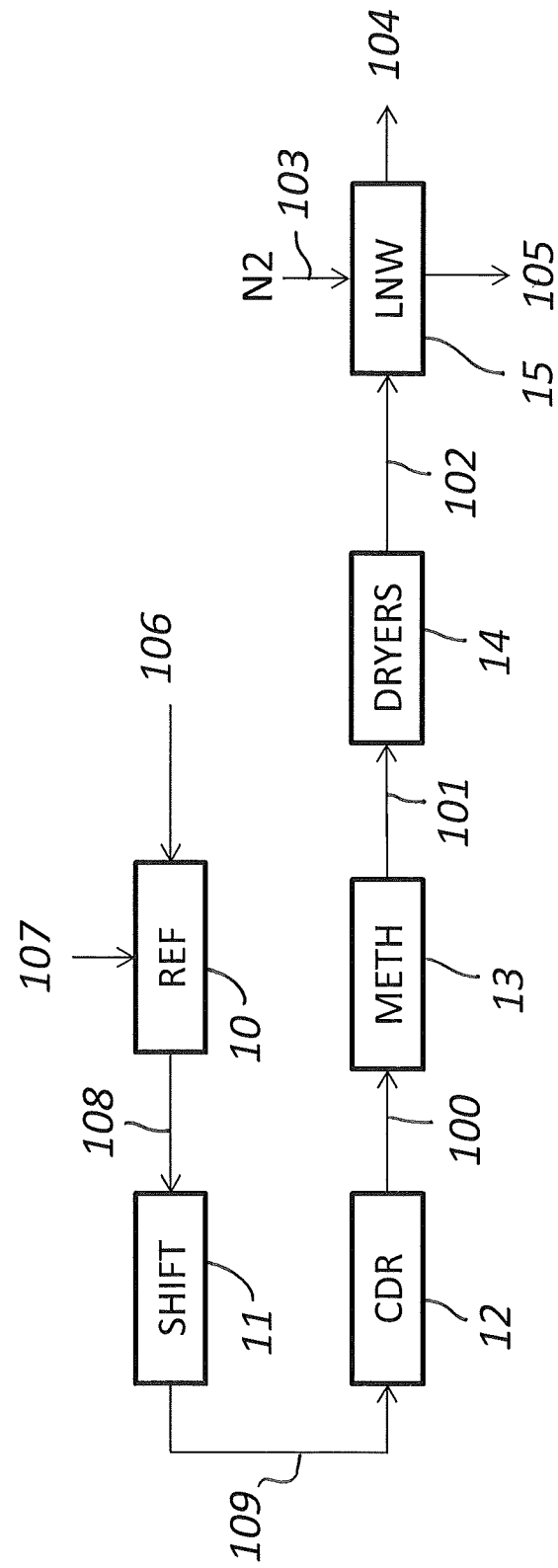

PROCESS FOR PURIFICATION OF A SYNTHESIS GAS CONTAINING HYDROGEN AND IMPURITIES

This application is a national phase of PCT/EP2014/063332, filed Jun. 25, 2014, and claims priority to EP 13173741.3, filed Jun. 26, 2013, the entire contents of both of which are hereby incorporated by reference.

FIELD OF THE INVENTION

The invention relates to a process for the purification of a hydrogen synthesis gas, particularly in a front-end of an ammonia plant.

BACKGROUND ART

The term of hydrogen synthesis gas in this description denotes a synthesis gas mainly composed of hydrogen, and comprising minor amounts of impurities including, for example, carbon monoxide, carbon dioxide, water, methane, argon. The term of syngas will also be used as a short form for synthesis gas.

A hydrogen synthesis gas can be produced for example in the front-end of a plant for the synthesis of ammonia, by reforming a hydrocarbon with a current of oxygen. Upon addition of a proper amount of nitrogen, a make-up gas suitable for the synthesis of ammonia is obtained.

The production of a hydrogen synthesis gas involves basically the following steps: reforming of a hydrocarbon source, such as natural gas, with oxygen; shift conversion, removal of $CO_2$. These steps remove most of the carbon monoxide and dioxide. More in detail, the shift converts CO into $CO_2$, which is then removed in a carbon dioxide removal unit. Common techniques for capturing the $CO_2$ from the gas are either a wash with a chemical or physical solvent, or a PSA (pressure swing adsorption) process using molecular sieves.

Some residual CO and $CO_2$, however, are still found in the gas after shift and $CO_2$ removal, together with impurities, e.g. small amounts of methane and Argon. Hence, the syngas needs a further purification. Said further purification is required particularly in case the hydrogen synthesis gas, after addition of nitrogen, is used for the synthesis of ammonia.

Said purification may include liquid nitrogen washing (LNW), which is carried out at a cryogenic temperature, such as 180° C. below zero. Typically, a prior art process with LNW includes the following steps.

First, removal of residual $CO_2$ and water. Carbon dioxide and water must be removed before the nitrogen wash, because they would freeze at the low temperature of the latter. Usually, said step is performed by means of adsorption in a suitable dryer. Said dryer uses molecular sieves and requires a suitable dry gas as regeneration medium. Usually, the drier includes at least two vessels so that one vessel can be regenerated while the other is in operation. Said dry gas may be nitrogen or a portion of the purified synthesis gas.

Second, the nitrogen wash, where the syngas is washed by a current of liquid nitrogen in a suitable column. This process delivers a purified syngas virtually free of impurities, containing only some parts per million (ppm) of methane and Ar. For example, said purified syngas may contain 75% hydrogen and around 25% nitrogen. The impurities are collected in a current of tail gas, containing also some lost nitrogen. Said tail gas is normally used as a fuel, to recover some energy. It cannot be used as regeneration medium for the molecular sieves, since it contains some CO which would decompose at the high temperature of regeneration.

The design of the above process and of the related equipment is dictated by the removal of carbon monoxide. Indeed, carbon monoxide must be removed to reach a very low concentration (a few parts per million) in the purified gas. When carbon monoxide is removed to such a low concentration, the other impurities such as methane and argon are almost completely washed away. Hence, the desired removal of CO determines the amount of nitrogen for the LNW step.

An alternative technique to purify the syngas involves the use of a methanator, where residual CO and $CO_2$ are converted to methane and water. This technique is used especially in the field of ammonia synthesis, since methane is an inert to the synthesis of ammonia and substantially harmless to the synthesis loop and water can be easily removed, while CO and $CO_2$ are poison to the ammonia catalyst. A conventional process for producing ammonia synthesis gas is disclosed for example in EP-A-2065337.

A drawback of a methanator is that it consumes some of the available hydrogen. Accordingly, when the purification of the syngas involves a LNW stage, a methanator is not used, since the CO is almost completely removed during the nitrogen wash.

The above prior art still has some drawbacks. As stated above, the preliminary removal of $CO_2$ requires a regeneration gas, normally nitrogen or a portion of synthesis gas, which is a source of cost: production of nitrogen in excess of the amount required for the ammonia synthesis, via air separation, consumes energy; using a relevant portion of purified syngas as regeneration medium is not desirable, due to the relevant energy penalty. Furthermore, the dryer is an expensive item, especially when large molecular sieve volumes are required.

SUMMARY OF THE INVENTION

It is proposed to treat a hydrogen synthesis gas by methanation, before the step of cryogenic purification. After conversion of CO and $CO_2$ to methane and water, the water can be removed in a dryer, and the so obtained dehydrated syngas is fed to said step of cryogenic purification. Preferably, the cryogenic purification includes liquid nitrogen washing (LNW).

The term of removal of a certain component, such as removal of $CO_2$ or water, shall be understood as a removal of a substantial amount of the related substance, obtaining a gas stream deprived or substantially free of said substance. A minor, residual amount of the substance, according to technique, may remain in the gas stream depending on the circumstances.

Hence, an aspect of the invention is a process for purification of a hydrogen synthesis gas containing hydrogen, carbon monoxide, carbon dioxide, water and impurities, said process including a step of cryogenic purification and dehydration of syngas prior to said cryogenic purification, characterized by a step of methanation, converting CO and $CO_2$ to methane and water, prior to said steps of dehydration and cryogenic purification.

Said term of hydrogen synthesis gas denotes a gas composed mainly of hydrogen, with minor amounts of impurities such as CO, $CO_2$, $H_2O$ and other impurities. In particular, according to a feature of the invention, said gas contains no nitrogen. Preferably, the hydrogen content of said synthesis gas is at least 90% molar, the remaining being represented by the above mentioned impurities.

Said step of methanation converts CO and CO2 to methane and water. Usually, the amounts of CO and CO2 in the synthesis gas subject to methanation are residual amounts, after previous steps which normally include shift conversion and removal of carbon dioxide from shifted gas.

Methanation is carried out according to the following reactions:

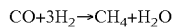

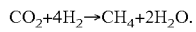

Methanation consumes some hydrogen, for example around 3% of the hydrogen contained in the syngas, thus it appears to reduce the value of the syngas, for example the amount of ammonia that can be synthesized at fixed syngas capacity. For this reason, in a conventional process with LNW it was preferred to remove completely the carbon dioxide by adsorption upstream the LNW. The applicant has found that, despite the above drawback of some hydrogen consumed, it is surprisingly advantageous to combine methanation and cryogenic purification such as LNW. More in detail, the applicant has found that the above combination is advantageous to the overall process because of the following benefits.

A first positive effect, compared to the known art, is that adsorption is used to capture water, since residual CO2 is converted during the methanation step. After methanation, a substantial amount of water can be easily removed by air-cooled or water-cooled condensation, so that the actual amount of water to be adsorbed is reduced. As a consequence, much smaller volumes of molecular sieves and a less amount of gas for regeneration are required, compared to prior-art solution where residual carbon dioxide and water are both removed with molecular sieves. The size and cost of molecular sieves drying unit are drastically reduced thanks to the invention.

Most of the CO2 is normally removed prior to the steps of methanation and cryogenic purification, in a suitable CDR (carbon dioxide removal) unit. Thanks to the invention, there is no need to push the CO2 removal to very low ppm of residual, which is energy intensive and difficult to achieve with ordinary chemical solvents, since the residual CO2 which escapes the CDR unit can still be converted in the subsequent methanation step. This is another positive effect since the extent of carbon dioxide removal can be optimized, taking due account of costs.

The impurities in the syngas admitted to the cryogenic purification section basically consists of methane (CH4) and Argon. Both methane and Argon are not dangerous for synthesis of ammonia, contrary to CO and CO2 which deactivate the ammonia catalyst. Moreover, Ar and CH4 do not freeze at the low temperature of the cryogenic section. Hence the process is relatively tolerant. Although it is desirable to have a low content of methane and Argon, to avoid their accumulation in the synthesis loop, it is not necessary to bring the cryogenic purification to extreme levels of purity, since the most dangerous impurities (namely CO and CO2) are eliminated before the cryogenic stage. This is an advantage both in terms of capital cost and consumption, e.g. nitrogen consumed in a LNW.

Another advantage is that the process is applicable irrespective of the method for removing carbon dioxide. In particular, the process is applicable even if the residual amount of CO2 in the gas leaving the CDR unit is relatively high, e.g. 1000 ppm. This is especially suitable in the case of revamping.

Yet another advantage is that the tail gas discharged from the LNW does not contain carbon monoxide. Hence, said tail gas can be used for regeneration of molecular sieves, instead of using additional nitrogen from an air separation unit or syngas that can otherwise be used for ammonia synthesis.

An aspect of the invention is that CO and CO2 are converted in the methanator contrary to the prior art technique where CO2 is captured by dryers and CO is separated by the nitrogen washing.

In summary, the invention reduces the size of the sieves (which are required to adsorb only a little water and no carbon dioxide) and reduces as a consequence the energy consumed for the regeneration of said sieves; the duty of the LNW is also reduced since the input contains CH4 but no carbon monoxide. Given the absence of CO, a methane slip is less negative to the synthesis, and the LNW need not be pushed to a high purity, which is another advantage in terms of costs.

Another aspect of the invention is a plant for the production of a hydrogen synthesis gas, according to the attached claims.

Still another aspect of the invention is a method for revamping an ammonia plant, according to the attached claims.

BRIEF DESCRIPTION OF THE FIGURES

FIG. 1 is a block scheme of a front end for generation of ammonia synthesis gas, according to an embodiment of the invention.

DESCRIPTION OF A PREFERRED EMBODIMENT

Referring to FIG. 1, a current of hydrogen syngas 100 is composed mostly of hydrogen (H2), and contains minor amounts of CO, CH4, CO2, N2, Argon and water. For example H2 is more than 90%, preferably more than 95%, CO and CH4 are around 1-2%, and the other components are preferably less than 1%.

Said current 100 comes from previous treatments of shift and carbon dioxide removal, as will be explained below. Hence the CO and CO2 contained in the current 100 are residual amounts after the above treatment steps.

Said current 100, according to the shown embodiment, is fed to a methanator 13 where CO and CO2 are converted to methane and water. The syngas 101 leaving the methanator 13 contains practically no CO and CO2, and a certain amount of methane, for example around 3% of methane.

Said gas 101 is fed to a dehydration unit 14, to remove residual water. The dehydrated gas 102 leaving said unit 14 is sent to a cryogenic purification section, which in the example is embodied as liquid nitrogen washing (LNW) unit 15. In said unit 15, the gas 102 is washed with liquid nitrogen 103. The output of said unit 15 includes the purified syngas 104 and tail gas 105.

Said purified syngas 104 can be used to produce ammonia, in a suitable synthesis loop. To this purpose, a suitable amount of gaseous nitrogen is added to the syngas in the washing unit 15, so that said syngas 104 contains hydrogen and nitrogen in the stoichiometric ratio 3:1 for the production of ammonia (NH3).

The current 100 is generally obtained after previous steps of reforming, shift and CO2 removal.

Referring to FIG. 1, and according to a preferred embodiment, a hydrocarbon source 106, for example natural gas, is reformed in a reforming section 10 with oxygen 107, obtaining a product gas 108 predominantly composed of hydrogen. Said gas 108 is shifted in a converter 11 to produce a shifted gas 109, and said shifted gas 109 is subject to carbon dioxide removal in a CDR section 12. The CO2-depleted gas leaving said section 12 forms the above mentioned hydrogen gas current 100, which is admitted to the methanator 13.

In some embodiments, a portion of the syngas 102 may bypass the LNW unit 15 and join the stream 104, to reduce the size of said unit 15, provided that the impurities in the product as are within acceptable levels.

A process according to FIG. 1 has been compared to a conventional process where the gas current leaving the CDR unit is sent directly to driers for removal of CO2 and water, and then to a LNW stage.

For a given feed of natural gas, it has been noted that the process according to the invention delivers 4% less of synthesis gas, due to the consumption of the methanator 13.

However, the water to be adsorbed is around $\frac{1}{6}$ compared to the prior art, and moreover water is much easier to capture in the mole sieves than CO2, which means that the molecular sieves are much smaller and less expensive; the regeneration can be carried out with tail gas from the same PSA which removes the carbon dioxide, without the use of fresh nitrogen or part of the purified gas; the nitrogen consumed in the LNW stage is 25% less; the tail gas released from the LNW has a higher heat value since it contains more methane and less nitrogen, hence more energy can be recuperated by using said tail gas as a fuel.

The above positive effects over-compensate the consumption of hydrogen in the methanator.

The invention claimed is:

1. A process for purification of a current of hydrogen synthesis gas f or obtaining a make-up synthesis gas for the synthesis of ammonia, said current of hydrogen synthesis gas to be purified being composed of hydrogen and minor amounts of carbon monoxide, carbon dioxide, water and impurities and containing at least 90% (mol) hydrogen, said process including a step of cryogenic purification, and dehydration of syngas through molecular sieves prior to said cryogenic purification, the process comprising a step of methanation of said current of hydrogen synthesis gas to be purified, wherein carbon monoxide and carbon dioxide are converted into methane and water, prior to said steps of dehydration and cryogenic purification, said step of cryogenic purification comprising a liquid nitrogen wash;
wherein hydrogen synthesis gas is washed with liquid nitrogen in a column and wherein said molecular sieves being regenerated by using tail gas discharged from said liquid nitrogen wash.

2. The process according to claim 1, wherein said current of hydrogen synthesis gas to be purified is obtained by reforming of a hydrocarbon source with oxygen, shift conversion of carbon monoxide to carbon dioxide, and removal of carbon dioxide.

3. The process according to claim 1, wherein a portion of the hydrogen synthesis gas, after said step of methanation and dehydration, bypasses said cryogenic purification.

* * * * *